Patented Mar. 28, 1950

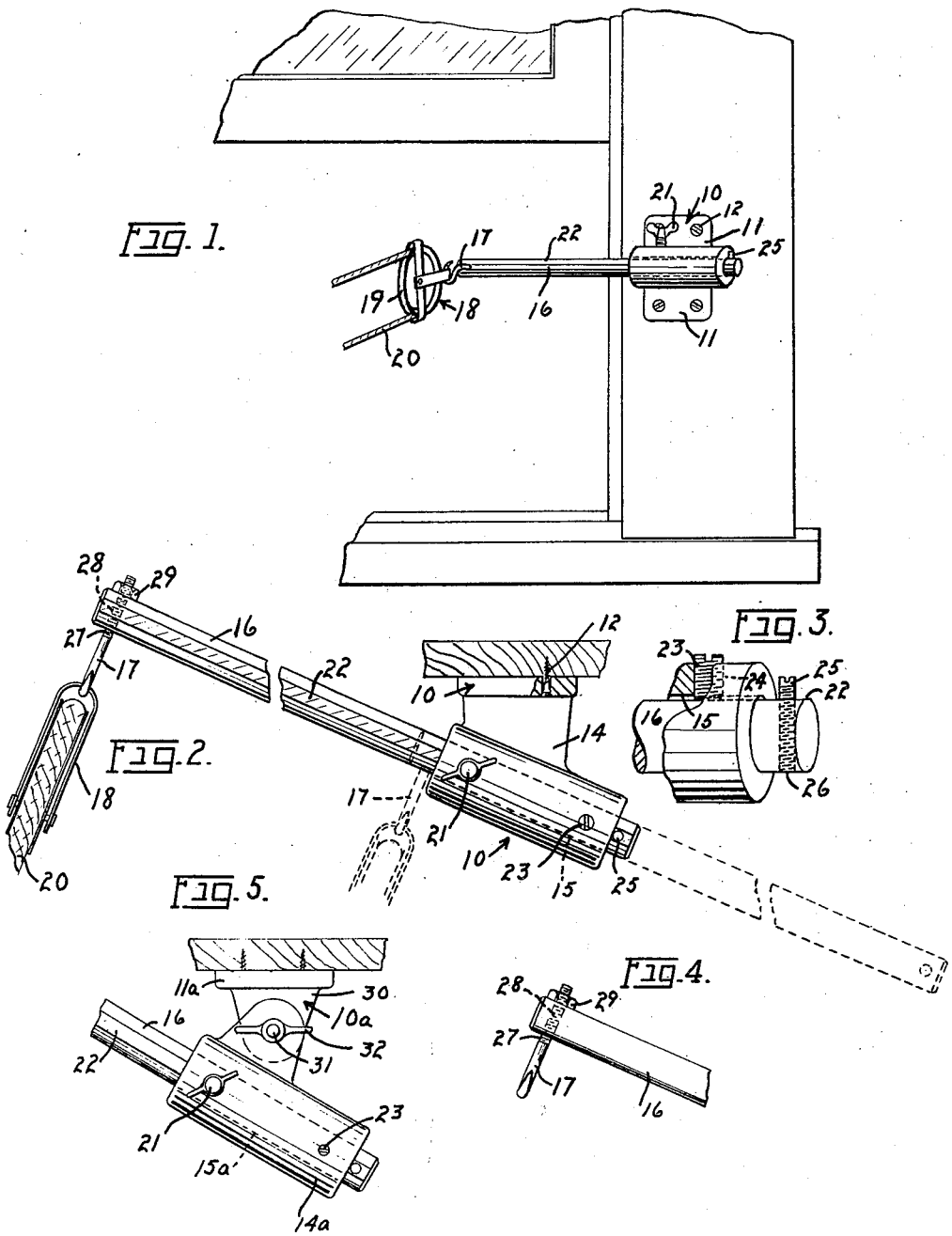

2,501,752

UNITED STATES PATENT OFFICE 2,501,752

ADJUSTABLE CLOTHESLINE SUPPORT

Gustav F. Ambrosius, Bloomfield, N. J.

Application June 24, 1948, Serial No. 35,037

3 Claims. (Cl. 248—298)

This invention relates to clothesline supports and the like, and more particularly to means for adjustably mounting a clothesline in proximity to a window or the like so as to bring it within easy reach for hanging out clothes.

A wide variety of adjustable clothesline holders have been proposed for use, but they tend to be unduly complicated or cumbersome and many are of such character as to greatly increase the wear on the line, the tension of the line or both. The number of them, moreover, are of such nature as to oppose undue resistance to the wind and thus to be subject to undesirable stress and to tendencies toward rattling.

With the foregoing and other considerations in view, the present invention contemplates the provision of a clothesline holder which is simple and sturdy in construction, which occupies a minimum of space, which opposes a minimum of resistance to the wind, which does not substantially vary the tension on the line, which does not subject the line to any unusual wear or stress, and which can be operated with extreme ease and effectiveness.

In accordance with the invention there is provided a slidable member to which a pulley or similar arrangement may be hitched and means to mount the slidable member generally laterally of a direction outwardly of a window, and preferably at an angle of less than 45° with a wall in proximity to the window from which the operator will hang clothes on the pulley line. In various of its more specific aspects the invention contemplates the provision of a rod-and-sleeve arrangement whereby a rod is mounted for movement generally parallel with the window opening, and, preferably, somewhat inwardly; effective hitch and stop means on the rod or other sliding member; means to prevent the sliding member from turning; means to provide an adjustable mounting for the sliding member; and/or a support-construction adapted to mount a sliding member at either of the sides of a window.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

Figure 1 is a side view of one form of device embodying the invention in use;

Fig. 2 is a top view thereof;

Fig. 3 is an enlarged fragmentary side view;

Fig. 4 is a fragmentary bottom view of the rod with the hook in a different position; and Fig. 5 is a top view of another modified form of construction embodying the invention.

In the form of construction exemplified in Figs. 1-3, there is provided a support 10 including a plate 11 adapted to be secured, as by screws 12, to a window frame or to other portions of the wall of a house outside a window or door, to an upright at the outside of a balcony, or elsewhere. A bracket 14 forming part of the support 10 is provided with a bore 15 in which there is slidably mounted a rod 16 on the end of which is a hook 17 which in use carries a pulley arrangement 18 on the sheave 19 of which a clothesline 20 is strung. A wing screw 21 serves to releasably hold the rod 16 in an adjusted position. The rod 16 is keyed in the bore by the provision of a flattened surface 22 on the rod and of flat-bottomed screw 23 in a transverse bore 24 in the bracket. The screw 23 is screwed down enough to prevent turning but not sliding movement. The rod is provided with removable means exemplified by the screw 25 for preventing the free end of the rod from passing thru the bore 15.

While the invention in certain of its broader aspects contemplates the provision of means to mount the sliding element at any of a wide variety of angles with the wall, as, for instance, parallel to the wall, or even at a slight outward angle; the invention in its more specific aspects contemplates the provision of means for mounting the sliding member at an inward angle of less than 45° with the wall and preferably between 15° and 30° therewith. As exemplified in Figs. 1-3 the rod is mounted at an inward angle of 23° with the wall. By an arrangement as contemplated by the invention in its more specific aspects there is provided a structure which will not only center the pulley arrangement with respect to the window as the rod is drawn toward the user, but will also bring the pulley arrangement somewhat inwardly of the window. At the same time the radial distance between the operative end of the rod and the distant post or wall to which the other end of the clothesline is secured will not be significantly varied as would be the case if the inward angle of the rod with the wall were over 45°, or, even, in some instances, over 30°.

As will be apparent, the plate 11 and the bracket 14 are so arranged that the plate may be placed either at the right hand or left hand side of the window. In order that this may be done without any difference in effectiveness, the stem 27 of the hook 17 is threaded and is screwed into a threaded bore 28 in the rod. It is held in position by a nut 29, but, on releasing the nut, may be given a half turn to the position shown in Fig. 4. Thus, to reverse the construction, it is merely necessary to turn the hook, loosen the screw 21, and remove the screw 25, and, after the plate has been reversed and screwed on, to insert the rod 16 into that end of the bore 15 which is nearer the window, after which the screw 25 is reinserted. The screws 21 and 23 will now be on the underside of the bracket, but the screw 21 may be as readily operated in this position as the other.

In certain instances it is desirable, instead of arranging the bracket so as to mount the rod at a fixed angle with the plate 11, to mount the bracket adjustably so that the rod may be slidable at that angle which the user finds most convenient. To this end the construction 10a exemplified in Fig. 5 comprises a mounting plate 11a carrying a lug 30 on which is mounted a bolt 31 which rotatably supports the rod-carrying bracket 14a in the bore 15a of which the rod 16 is slidably mounted. A wing nut 32 is provided to hold the structure in adjusted position.

While any of a wide variety of metals, such as brass or stainless steel, may be employed for providing a contruction such as contemplated by the invention, considerations of economy, lightness of weight, corrosion resistance, and general effectiveness indicate the use of aluminum alloy or other light metal alloy as contemplated by the invention in its more specific aspects.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A clothesline support comprising a bracket including a mounting plate and a connection extending outwardly therefrom and carrying an open-ended sleeve disposed at an acute angle to the plate, a rod movably extending thru said sleeve and out of both ends thereof and having a pulley-mounting structure at one end and a movement-limiting protuberance at the other, said sleeve having a releasable member for holding said rod in an adjusted position, whereby the pulley-mounting structure may be drawn inwardly of an opening in a wall on which said plate is mounted and returned to an outward position.

2. A clothesline support as set forth in claim 1, wherein said angle is not more than 45°.

3. A clothesline support as set forth in claim 1, wherein said pulley-mounting means and said stop are interchangeably secured on said rod providing for mounting the plate on a desired side of the window.

GUSTAV F. AMBROSIUS.

REFERENCES CITED

The following references are of record in the file of this patent:

UNITED STATES PATENTS

| Number | Name | Date |
| --- | --- | --- |
| 419,137 | Bobemerith | Jan. 7, 1890 |
| 1,053,255 | Ward | Feb. 18, 1913 |
| 1,281,748 | America | Oct. 15, 1918 |
| 1,620,254 | Gauss | Mar. 8, 1927 |
| 1,632,726 | Conklin | June 14, 1927 |